US007756922B2

(12) United States Patent
Basu et al.

(10) Patent No.: US 7,756,922 B2
(45) Date of Patent: *Jul. 13, 2010

(54) SCHEMA ANNOTATIONS FOR MANAGING CACHED DOCUMENT FRAGMENTS

(75) Inventors: Julie Basu, San Mateo, CA (US); Nilesh P. Junnarkar, Fremont, CA (US); Olga A. Peschansky, Castro Valley, CA (US); Kevin Dirk Munroe, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 952 days.

This patent is subject to a terminal disclaimer.

(21) Appl. No.: 11/341,194

(22) Filed: Jan. 27, 2006

(65) Prior Publication Data

US 2007/0180144 A1    Aug. 2, 2007

(51) Int. Cl.
*G06F 15/16* (2006.01)
(52) U.S. Cl. .................. 709/203; 709/213; 709/216; 709/217; 709/223; 715/234; 715/239
(58) Field of Classification Search .......... 709/203, 709/213, 216, 217, 223; 715/513, 514, 530; 707/201
See application file for complete search history.

(56) References Cited

U.S. PATENT DOCUMENTS

| 6,167,438 A * | 12/2000 | Yates et al. ............... 709/216 |
| 6,922,754 B2 | 7/2005 | Liu et al. |
| 7,076,611 B2 | 7/2006 | Steere et al. |
| 2003/0115281 A1* | 6/2003 | McHenry et al. ............ 709/213 |
| 2005/0131962 A1* | 6/2005 | Deshpande .................. 707/201 |
| 2007/0136663 A1* | 6/2007 | Grigoriadis et al. ......... 715/530 |
| 2007/0179928 A1 | 8/2007 | Basu et al. |

OTHER PUBLICATIONS

"Edge Side Includes (ESI) Overview" May 14, 2001, 7 pages, Oracle Corporation.
Fallside, D. et al., "XML Schema Part 1: Structures Second Edition", W3C Recommendation Oct. 28, 2004, 70 pages.
"XML Schema 1.1 Part 2: Datatypes", W3C Working Draft Feb. 17, 2006, 184 pages.
"Managing Cache Invalidation with OracleAS Portal 10g", Oracle Technology Network, Jun. 2004, 3 pages, Oracle Corporation, Redwood Shores, California.
"Oracle ADF Faces Cache Tag Library", Oracle Technology Network, May 2005, 3 pages.

* cited by examiner

*Primary Examiner*—Yves Dalencourt
(74) *Attorney, Agent, or Firm*—Hickman Palermo Truong & Becker LLP; Adam C. Stone

(57) ABSTRACT

The challenge of communicating document caching policies from document servers to client processes in the most generally applicable manner is solved by enabling the application of caching policies to classes of documents, rather than single instances of documents. Caching policies are applied to a given class of documents by specifying caching policies in metadata that describes the structure of the class of documents that conform to the metadata. In the context of XML data documents and document fragments, an XML schema can be annotated to include a representation of a caching policy, thereby specifying the caching policy for XML data documents and fragments that conform to the corresponding XML schema.

14 Claims, 4 Drawing Sheets

SCHEMA ANNOTATIONS FOR MANAGING CACHED DOCUMENT FRAGMENTS

CROSS-REFERENCE TO RELATED APPLICATIONS

This application is related to U.S. patent application Ser. No. 11/341,133 filed Jan. 27, 2006, entitled "SCHEMA ANNOTATIONS FOR CACHE MANAGEMENT"; the entire content of which is incorporated by this reference for all purposes as if fully disclosed herein.

FIELD OF THE INVENTION

The present invention relates generally to content delivery over a network and, more specifically, to managing caching policies for content transported over a network.

BACKGROUND

The Extensible Markup Language (XML) is a convenient standards-based universal format for representing and processing data. Information from almost any data source (databases, spreadsheets, messages, Enterprise JavaBeans, etc.) can be represented as XML data documents and exchanged with another entity. The entity that produces XML data documents is referred to herein as the "document server," and the recipient of XML documents is referred to herein as the "client process."

Once an XML data document is served to a client process, that process may want to cache the document. For non-limiting examples, a client process may want to cache documents in local memory, or at a proxy server. There are many reasons for caching, such as for increasing the speed of document delivery, for reducing load on the document server, and for reducing network bandwidth usage. A cached document, whether it contains static or dynamic content, typically expires at some time t after being served by the document server. In the simplest caching scheme, a client process can invalidate the cached document at its own discretion, but it should respect t as the upper bound (i.e., a document aged t+k, where k>0 is invalid). In more realistic caching schemes, a certain "staleness" or "grace period" is allowed, where k>0, wherein the expired cached document may still be served by the client process.

If a cached document was composed from several data sources, different portions of the document (i.e., XML document fragments) may expire at different times. For example, a Web portal may want its movie listings to expire every 7 days while its stock quotes expire every minute. A caching arrangement for a document that is composed from multiple data sources is described as the set S of bindings {p, C}, where p is a path starting at the document root and leading to one or more document fragments and C is the set of caching policies for all nodes found at p. A client process should refresh portions of a cached document according to S. However, communicating S to all client processes in the most general and efficient way possible poses a challenge.

A document server, or some other entity involved in the management of network content delivery and/or the management of delivered content, may want to control caching policies with respect to the content under their management. For example, a document server may want to control how long a given document or portion of the document should be cached by a client process or at a proxy server, e.g., to allow the client application to function properly. This may be because the document or portion of the document contains embedded access URLs, which may occasionally change, and the server needs to supply the new URLs with the document upon refresh. For another example, a document server that publishes near real-time information may want to control how long a given document or portion of the document should be cached at a client or proxy server to avoid proliferation of obsolete information. One such example may be a stock market (e.g., NASDAQ), which may want to control how long stock price information that it releases to the public is cached, so that client processes do not further disseminate information that is too stale.

One approach for a document server to convey caching policies to client processes is to annotate documents on a per-document basis. For example, with an ESI ("Edge Side Includes," a simple markup language for use in identifying content fragments for dynamic assembly at the network edge) approach, the document server sends t in a special ESI header of an HTTP response, along with the requested XML data document. This approach is protocol-specific so if the document server uses different wire protocols, e.g., SOAP or RMI/IIOP, a new method to communicate documents' expiration properties must be defined. In the context of document fragments, ESI follows an approach in which, for each, separately cacheable fragment, the document server places an ESI markup tag containing C. However, with this approach, documents that are already deployed may be difficult or impossible to retrofit with ESI, and updating code to generate new documents with ESI tags is also difficult and laborious.

Generally, the document server could include caching information in the body of a document or in the HTTP response header. However, this caching information would need to be generated for every applicable document. Furthermore, many Web page documents are dynamically generated by an application program in an automated manner, e.g., by a servlet or Java Server Page implementation. Thus, implementing a caching policy for such a document after the application program is implemented would require changes to the program code associated with that document. Even to implement a caching policy for a static Web page after posting the page would require changes to the document server serving the page. Having to change the underlying code for an application program or Web page can be labor intensive and error prone, a problem that is exacerbated when such changes are required for multiple pages or documents, multiple applications, multiple client devices, multiple transport protocols, etc.

One other approach for a document server to convey caching policies to client processes is for the client process to ask the document server directly. The document server could provide a method (e.g., a remote procedure call) for a client process to ask for t, given some document instance. This requires extra programming from both server and clients and, therefore, is not an optimal solution.

Specification of fragment-based caching becomes even more complicated when documents are dynamically assembled by application frameworks in which code that assembles the documents is, in turn, generated by tools rather than written by a human. For example, it is a complicated task to embed caching tags into responses generated using the JavaServer™ Faces framework. In many situations, embedding caching tags into document instances simply cannot be accomplished with existing approaches, because the presentation layer that is normally responsible for inserting the tags is a few layers removed from the modules that generate dynamic fragments and which would have the caching policies for those fragments.

The foregoing approaches also have the disadvantage of the document server sending redundant data, i.e., the value t is unlikely to change for each document expiration cycle, and should not have to be sent repeatedly. Also, these approaches are not centralized, i.e., any change to the caching policy needs to be communicated to all the possible points where document server responses are assembled. For example, stock information documents may be served in the form of HTML pages, and as part of an XML-based stock quote web service. The same class of XML documents that is sent via the stock quote web service is also used to generate an HTML page (via stylesheet transformation). Thus, even if both forms of the stock information use, for example, the HTTP protocol and the ESI caching header, there are likely different endpoint modules that are responsible for creating the response and inserting the caching header in it (e.g., a Web service versus a servlet or a JSP). Therefore, if the frequency of stock updates changes, both endpoints need to be updated with a new value.

XHTML is a family of current and future document types and modules that reproduce, subset, and extend HTML 4. XHTML family document types are XML based, and ultimately are designed to work in conjunction with XML-based user agents. XHTML documents are XML conforming and, therefore, are readily viewed, edited, and validated with standard XML tools. As with XML documents, once an XHTML data document is served to a client process, that process may want to cache the document. Thus, similar issues regarding management of network content caching policies are/will be present with XHTML-based applications and services as with XML applications and services.

Based on the foregoing, better techniques are needed for managing caching policies in the context of XML and other types of content commonly transported over a network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
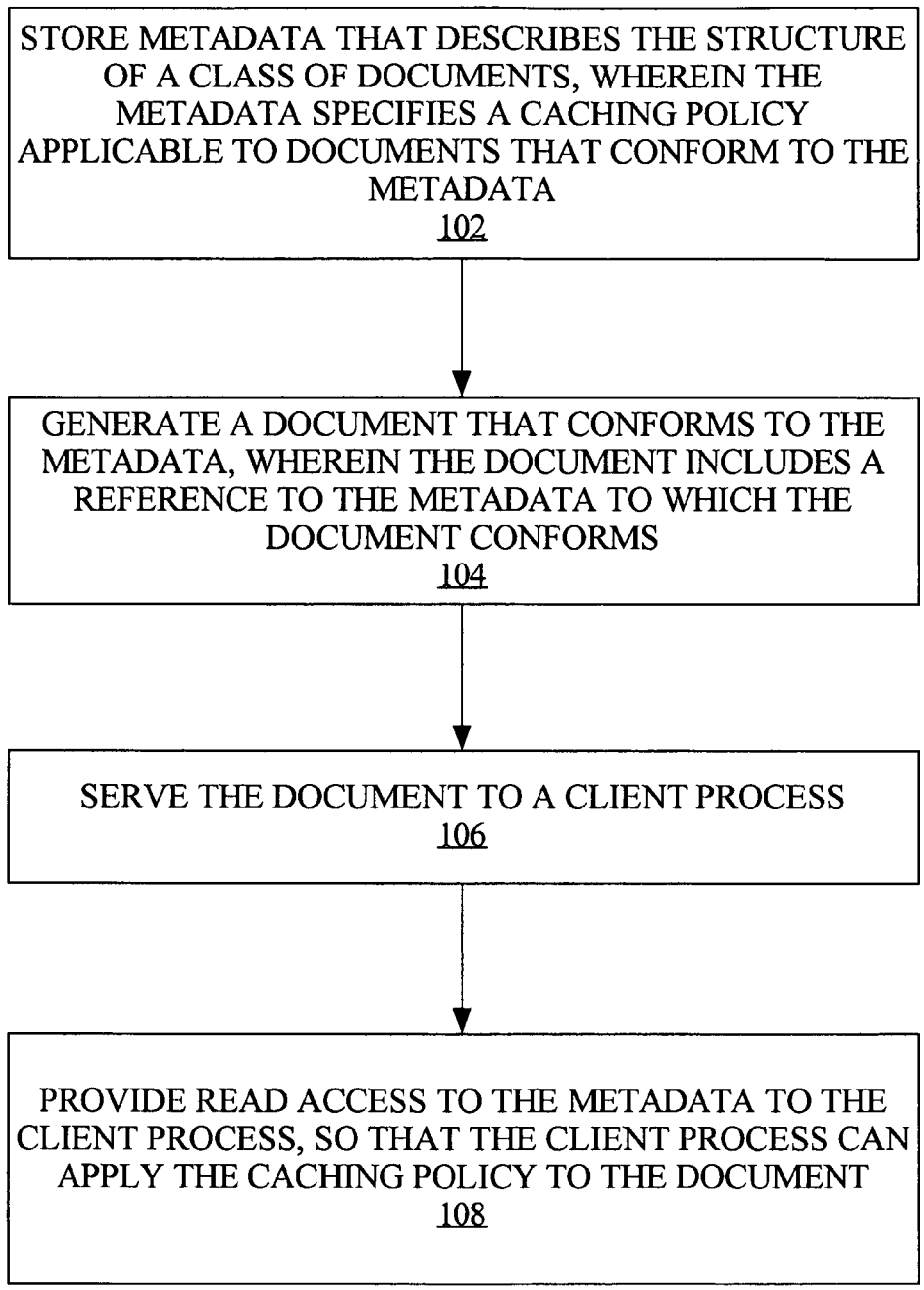
FIG. 1 is a flow diagram that illustrates a process for managing network content, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

The techniques described herein address the challenge of communicating document caching policies from document servers to client processes in the most generally applicable manner. These techniques enable the application of caching policies to classes of documents, rather than single instances of documents. Caching policies are applied to a given class of documents by specifying caching policies in metadata that describes the structure of the class of documents that conform to the metadata. In the context of XML data documents, for example, an XML schema (or Document Type Definition) can be annotated to include a representation of a caching policy, thereby specifying the caching policy for XML data documents that conform to the corresponding XML schema. Furthermore, caching policies for document fragments are applied to a given class of documents by annotating the metadata that corresponds to the class.

When a caching policy is specified in metadata, such as by the creator of or some controller of the corresponding data, client processes can use the caching information specified in the metadata to implement and/or apply the caching policy to all the documents that conform to the metadata. Processes at various tiers of the content delivery system can access and read a stored annotated XML schema. For example, when acting as a client process, the client process can read the schema in response to receiving an XML data document, or, when acting as a document server, the server process can read the schema in conjunction with generating an XML data document. Hence, these processes can identify and apply the caching policy to the received XML data document (i.e., the client process), or identify and implement the caching policy in the generated XML data document (i.e., the server process).

Some non-limiting advantages of the class-based cache policy techniques described herein over per-instance-based approaches include:

(a) protocol-independence, whereby cache properties are communicated for a class of documents in the content of corresponding metadata, rather than in a transport or other communication protocol used to deliver the data;

(b) centralized specification and maintenance, because when caching characteristics of a class of documents need to be changed, only the metadata needs to be changed, rather than each document in the class;

(c) efficiency, because redundant transmission of data is minimized because cache properties are transmitted and processed by a client process once for a class of documents, rather than once per document;

(d) declarative metadata-based approach, rather than a programmatic approach; and (e) non-invasive, because caching policies can be added to a class of documents after a system is already deployed, without changing existing code.

One non-limiting use case, content synchronization, is an important challenge for content delivery networks and replicated caches, such as in the context of edge server caching technologies. The techniques described herein streamline the synchronization of cached data, by specifying caching policies in metadata that is applicable to an entire class of documents rather than on a per-document basis.

Operating Environment-Storage System

The techniques described herein are described in the general context of a database system. A database system typically comprises one or more clients that are communicatively coupled to a database server that is connected to a shared database. "Database server" (as opposed to "document server") may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One database language supported by many database servers is known as the Structured Query Language (SQL).

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using the XQuery query language) or a relational-centric (e.g., using the SQL query language) manner. Such a repository is at times referred to as an XML repository or an XML database (i.e., "XDB"). Further, similar features and technologies may be used within a relational database system to provide native support for storage, management, and query of any class of information that is structured based on metadata corresponding to the class. For non-limiting examples, a relational database system may be augmented to support integration of EJB ("Enterprise JavaBeans") Beans or program components, XHTML data and metadata, Java programming language classes and corresponding objects, and the like.

In the context of a database system, caching policy information may be stored in metadata stored in the database, such as in an XML repository of a database system. Additionally, data corresponding to the metadata may also be stored in the database.

Annotating Metadata with a Document Cache Policy

FIG. 1 is a flow diagram that illustrates a process for managing network content, according to an embodiment of the invention. The process illustrated in FIG. 1 is implemented for automated performance by a conventional computing system, such as computer system 400 of FIG. 4. As described above, one possible operating environment in which the process of FIG. 1 may be implemented is a database system.

At block 102, metadata, which describes the structure of a class of documents that conform to the metadata. According to one embodiment, the metadata is stored in an XML data repository. Significantly, the metadata specifies one or more caching policies that are applicable to the class of documents, i.e., the documents that conform to the corresponding metadata.

According to one embodiment, the caching properties of a class of XML documents are embedded in annotations inside the XML Schema of the documents. XML Schema is a language that describes the structure of a class of XML documents, and is described in "XML Schema Part 1: Structures Second Edition" available as a W3C Recommendation from the W3C (World Wide Web Consortium), the content of which is incorporated by this reference in its entirety for all purposes as if fully disclosed herein.

With XML schema annotations regarding caching policies, an XML schema now describes both the structure and caching properties of the corresponding class of XML documents. Members of that class point to their schema in a standard way (see, e.g., the section "xsi:schemaLocation, xsi:noNamespaceSchemaLocation" in the referenced "XML Schema" document). Client processes can retrieve document and document fragment expiration properties and other caching properties from the documents' schema. The schema itself typically has some expiration window, which is usually much greater than t because the document structure is relatively stable. Hence, it is not necessary to scan the schema every time a document is invalidated from cache due to a caching policy, i.e., every time the document expires.

For sake of simplicity, document expiration time t is used herein as the primary example of caching properties of a document. However, embodiments of the invention are not limited solely to cache expiration time. That is, embodiments of the invention apply to a richer set of caching properties used by content delivery networks. For non-limiting examples, in addition to time to expiration, pertinent caching policies include policies regarding (a) Edge Side Includes "no-store-remote" and "freshness extension" or "grace period" time; (b) which servers other than the source servers should be allowed to cache documents and/or document fragments in the class, e.g., only proxy servers one level or degree away from a source server; and (c) what to do upon expiration of documents and/or document fragments in the class, e.g., a refresh link for refreshing a given document or fragment of the class. Thus, embodiments of the invention may be used for any property that applies to an entire class of documents. Furthermore, embodiments of the invention may be used for any type of metadata that defines a class of data, and which can be annotated with information regarding the handling of data in the class. For non-limiting examples, metadata and corresponding data for which embodiments can be implemented include (a) XML schemas and DTDs corresponding to XML documents and document fragments, as discussed herein, as well as (b) XHTML schemas corresponding to XHTML documents and fragments, (c) HTML DTDs corresponding to HTML documents, (d) definitions of Java classes with embedded annotations corresponding to cacheable Java instance objects that represent network content, and the like.

The following is an example of a schema, stockrequest.xsd, relating to stock information XML data documents, which is annotated to include a caching policy (in bold type):

```
<?xml version="1.0" encoding="windows-1252"?>
<xsd:schema xmlns:xsd="http://www.w3.org/2001/XMLSchema"
          xmlns="http://www.example.com/stocks"
     targetNamespace="http://www.example.com/stocks">
  <xsd:annotation><xsd:app-info>
    <cache:control
        schema-max-age = "86400"
        document-max-age = "3600"/>
  </xsd:app-info></xsd:annotation>
  <xsd:element name="quote">
    <xsd:complexType>
      <xsd:sequence>
        <xsd:element name="latest-price">
              </xsd:element>
        <xsd:element name="news">
          <xsd:complexType>
            <xsd:sequence>
              <xsd:element name="item" maxOccurs="unbounded"/>
            </xsd:sequence>
          </xsd:complexType>
        </xsd:element>
        <xsd:element name="description"/>
      </xsd:sequence>
    </xsd:complexType>
  </xsd:element>
</xsd:schema>
```

The annotations indicate the following:

the expiration time of any conformant document once delivered by the document server which, in this example, equals 3600 seconds (one hour); and the expiration time of the XML schema itself which, in this case, equals 86400 seconds (one day).

At block 104, a document is generated that conforms to the metadata stored at block 102. The document includes a reference to the metadata to which the document conforms. For example, an XML document is generated based on a corresponding XML schema that is annotated with the caching policy, and the document includes a reference to the corresponding XML schema.

The following is an example of XML data document, <quote>, which points (in bold type) to its corresponding XML schema, stockrequest.xsd, as defined in the XML Schema standard:

```
<quote>
    xmlns:xsi="http://www.w3.org/2001/XMLSchema-instance"
    xsi:schemaLocation="http://www.example.com/stocks
        http://www.example.com/stockRequest.xsd"
    symbol="ORCL"
    <latest-price>13.70</latest-price>
    <news>
        <item>Oracle Releases Latest XML Data Repository.
            Today Oracle Corp. announced the release of ...
        </item>
        <item>Oracle OpenWorld 2006 Schedule.
            We just finished Oracle OpenWorld 2005.
            We want to thank ...
        </item>
    </news>
    <description>Oracle Corporation, the world leader in database
        technology, was founded by ...
    </description>
</quote>
```

According to one embodiment, the generated document includes an implementation of the caching policy. For example, the document generated at block 104 could include a 'time to live' element (e.g., <ttl>60</ttl>) based on the caching policy specified in the stored schema, which specifies a number of minutes that indicates how long the document can be cached before it becomes invalid and should be refreshed from the source. With this scenario, the client process need not refer to the schema for the purpose of reading the caching policy because the caching policy is already built into, or implemented in, the document.

At block 106, the document is served to a client process. For example, the foregoing XML data document, <quote>, which conforms to the foregoing XML schema, stockRequest.xsd, is served to a client web browser for rendering. According to one embodiment, the document is delivered without any caching policies in the document itself, because the caching policy is specified in the corresponding metadata, e.g., the corresponding XML schema.

According to one embodiment, the document is served at block 106 by serving the document along with a header that includes an implementation of the caching policy for the document. For example, in response to a HTTP request from a client process, the document server may serve the document along with an HTTP response header that includes a representation of the caching policy, e.g., in a meta tag in the header.

At block 108, read access is provided to the client process, so that the client process can apply the caching policy specified in the metadata to the document served at block 106. For example, upon the first request for the document, the client process can read the schema and set up timers for document and schema expiration. Every 3600 seconds, the document instance is invalidated and, every 86400 seconds, the schema is invalidated. Any manner of handling, or not handling, invalidated documents may be used with embodiments of the invention. When the client process receives other stock information documents that conform to the same schema, it applies the same caching policies to all such documents.

Operating Environment-Content Delivery Systems

Figure 2B:
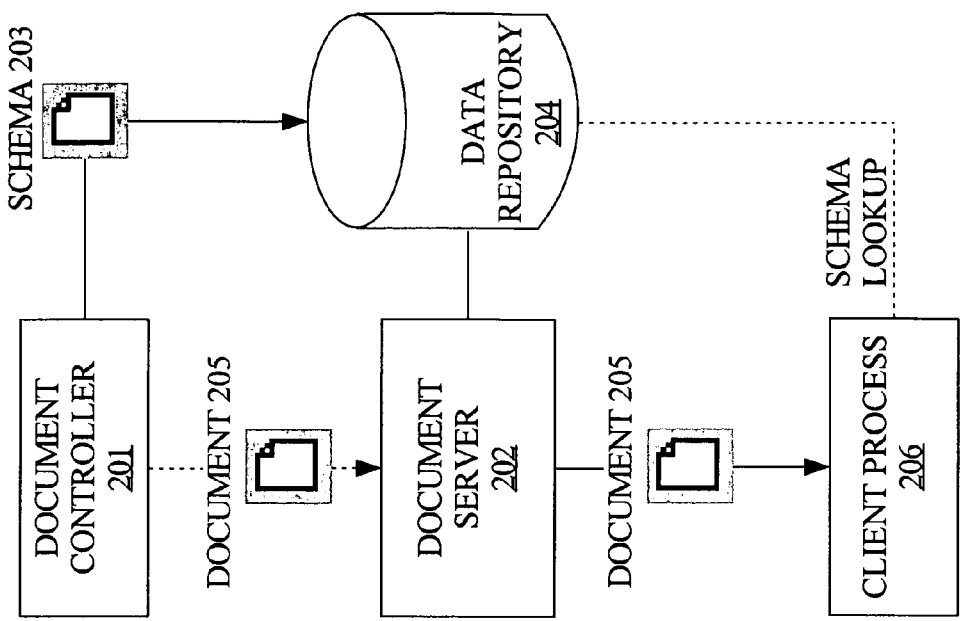
FIG. 2B is a block diagram illustrating an operating environment in which an embodiment of the invention may be implemented.
Figure 2A:
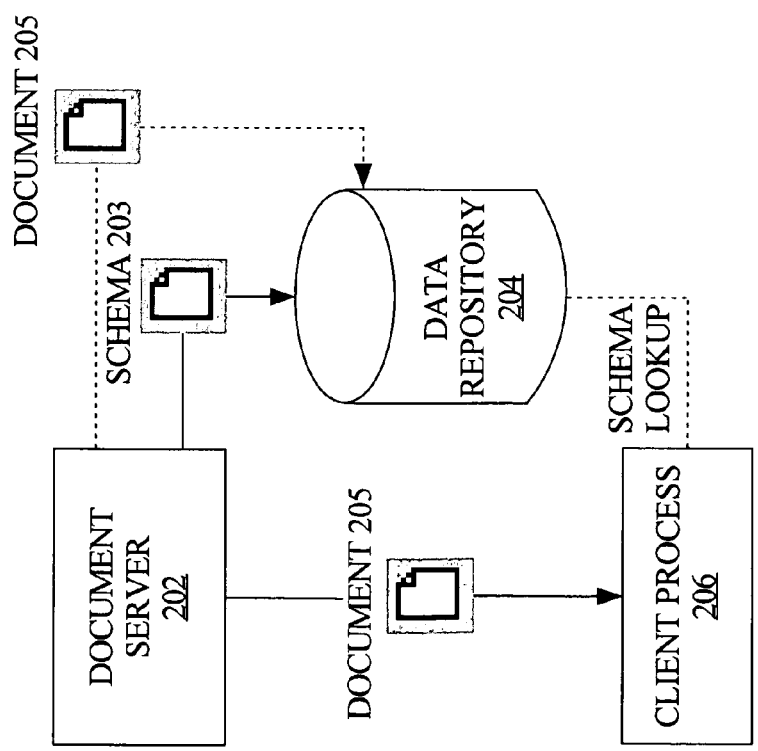
FIG. 2A is a block diagram illustrating an operating environment in which an embodiment of the invention may be implemented.

FIG. 2A is a block diagram that illustrates an operating environment in which an embodiment of the invention may be implemented. FIG. 2A illustrates a document server 202, a data repository 204 and a client process 206.

As described herein, a document server 202 is an entity that produces data documents. In the context of FIG. 2A, document server 202 generates a schema 203 and a corresponding conforming document 205. For a non-limiting example, document server 202 may be a provider of a network stock quote service, such as a Web portal, where the document server 202 produces, and serves to client Web browsers, XML-based stock information (e.g., the <quote> XML data presented herein) that conforms to a corresponding XML schema (e.g., the stockRequest.xsd schema presented herein). According to an embodiment of the invention, schema 203 is annotated to include a specification of one or more caching policies that apply to the class of documents that are generated in conformance with schema 203, such as document 205.

Document server 202 stores the schema 203 in a data repository, such as at block 102 (FIG. 1). For example, the data repository 204 may be an XML data repository of a relational database management system (RDBMS) augmented with features and technologies to enable storage of XML documents directly in the database. According to one embodiment, the schema 203 is an XML schema and the corresponding document 205 is an XML data document.

According to one embodiment, document server 202 generates document 205, such as at block 104 (FIG. 1), which conforms to the schema 203. Document server 202 may store the document 205 in the data repository 204 or, alternatively, may dynamically generate the document 205 in response to a request from client process 206 and serve document 205 to client process 206. As described herein, a client process 206 is the recipient of documents served by document server 202. For example, client process 206 is the recipient of an XML document that corresponds to and conforms to an XML schema.

In the context of FIG. 2A, document server 202 generates and serves document 205 to client process 206. According to one embodiment, document 205 includes an implementation of a caching policy that is specified in schema 203 for the class of documents that conform to schema 203. For non-limiting examples, document 205 includes a 'time to live' element/tag, or a 'refresh Link' operator that can be used to refresh a given document (or documents fragment) of the class.

According to an alternative embodiment, document server 202 serves document 205 to client process 206, along with a header that includes an implementation of the caching policy. For example, document 205 is served to client process 206 with an HTTP response header that includes some representation of the caching policy specified in the schema 203.

In both of the foregoing embodiments, client process 206 need not read schema 203 for caching purposes because the caching policy is already implemented in the document 205 or in a corresponding header. However, client process 206 may need to read schema 203 for other purposes, such as to conventionally validate that document 205 conforms to schema 203.

According to one embodiment, document server 202 neither generates document 205 with an implementation of the caching policy specified in schema 203 nor serves document 205 with an implementation of the caching policy. In this scenario, read access is provided to the client process 206 so that client process 206, or other client processes or proxy servers for example, can lookup schema 203 and apply the caching policy that is specified in the schema 203. Furthermore, client process 206 can apply the same caching policy that is specified in schema 203 to the entire class of documents that conform to schema 203. That is, for every document that corresponds to schema 203 that client process 206 receives, client process can apply the same caching policy or policies specified in schema 203. Additionally, client process 206 need not lookup and read the schema 203 for each corresponding document 205 received, but can simply apply the caching policy for as long as the schema 203 remains valid for the corresponding class of documents.

FIG. 2B is a block diagram illustrating an operating environment in which an embodiment of the invention may be implemented. The operating environment illustrated in FIG. 2B is a variation of the operating environment illustrated in FIG. 2A, where like-referenced elements in FIG. 2B function similarly to corresponding elements in FIG. 2A, unless otherwise noted. Another entity is illustrated in FIG. 2B, i.e., a document controller 201.

Document controller 201 represents an entity that wants to control the caching policy or policies of some particular class of content, but that does not necessarily generate the content itself. For a non-limiting example, document controller 201 may be a provider of a network stock quote information, such as the NASDAQ stock market, and where the document server 202 (e.g., a Web portal) produces and serves to client web browsers (e.g., client process 206), XML-based stock information (e.g., the <quote> XML data presented herein; e.g., document 205) that conforms to a corresponding XML schema (e.g., the stockRequest.xsd schema presented herein; e.g., schema 203). In this example, the document controller 201 may produce stock information every x seconds and, therefore, would want cached stock information to expire around every x seconds. Further, the document controller 201 may, at times, want to change x. Thus, such a change can readily be made in the schema 203 so that it applies to all client processes 206 that use XML data documents that conform to the schema, rather than notifying each client process 206 or manually changing every instance of document 205.

For another non-limiting example, document controller 201 may be a provider of a network stock quote service (e.g., a Web portal) that produces and serves to client applications, XML-based stock information that conforms to a corresponding XML schema, where the client application functions as document server 202 by manipulating and serving the information to another client application, i.e., to client process 206.

Document controller 201 stores the schema 203 in a data repository, such as at block 102 (FIG. 1). According to one embodiment, the schema 203 is an XML schema and the corresponding document 205 is an XML data document. Document server 202 serves, and may generate, document 205 to client process 206, where document 205 conforms to schema 203. As with FIG. 2A, document 205, or an associated document header or communication protocol header, may include an implementation of the one or more caching policies specified in schema 203. Alternatively, document 205 or an associated header may not include an implementation of the one or more caching policies specified in schema 203, rather document 205 simply includes a reference to schema 203 for lookup by a client process 206.

In the context of FIG. 2B, document controller 201 provides read access to schema 203, for example, for any or all of the following functions. Read access may be provided so that a document server 202 can construct a document 205 that conforms to the schema 203, where the document 205 is for delivery over a network to one or more client processes 206 and where the document 205 (or an associated header) includes an implementation of the one or more caching policies specified in schema 203. Read access may be provided so that a client process 206 can apply to document 205, which client process 206 received over a network, the one or more caching policies specified in schema 203, where the document 205 identifies the corresponding schema 203 as the schema to which the document 205 conforms.

Client-Side Use of XML Schema Annotated with a Cache Policy

Figure 3:
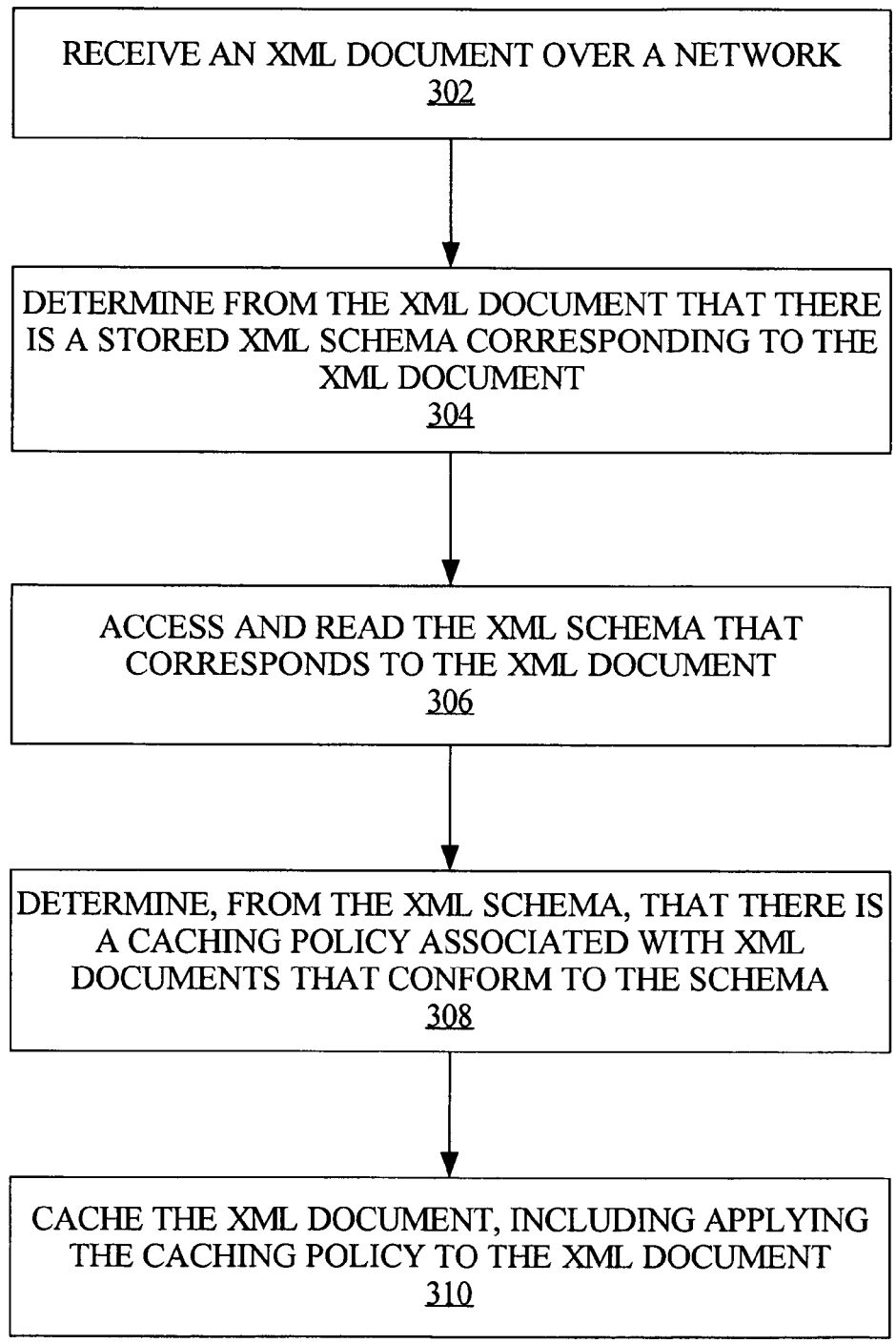
FIG. 3 is a flow diagram that illustrates a process for managing XML content received over a network, according to an embodiment of the invention.

FIG. 3 is a flow diagram that illustrates a process for managing XML content received over a network, according to an embodiment of the invention. The process illustrated in FIG. 3 is implemented for automated performance by a conventional computing system, such as computer system 400 of FIG. 4. As described above, one possible operating environment in which the process of FIG. 3 may be implemented is a database system.

At block 302, an XML document is received over a network. For example, a client process 206 (FIG. 2A), such as a Web browser, requests and receives an XML data document 205 (FIG. 2A) from a document server 202 (FIG. 2A). In this context, the XML document does not include an implementation of a caching policy, nor does any header associated with the document. For example, a client process receives the <quote> XML document presented herein.

At block 304, the client process determines, from the XML document, that there is a stored XML schema that corresponds to the XML document, and which describes the structure of a class of documents of which the XML document is a member. For example, client process 206 (FIG. 2A) determines from the 'xsi:schemaLocation' URL contained within the received document 205, that schema 203 exists and corresponds to the document 205. For example, the client process identifies schema 'stockRequest.xsd' from the received <quote> document.

At block 306, the client process accesses and reads from storage the XML schema that corresponds to the received XML document. For example, client process 206 (FIG. 2A) requests the schema 203 (FIG. 2A) from document server 202 (or, for example, from a database server that manages data in data repository 204), based on the link identified in document 205 (FIG. 2A).

At block 308, the client process determines, from the XML schema, that there is a caching policy that is applicable to all XML documents that conform to the schema. For example, client process 206 (FIG. 2A) identifies, from the cache control element in the schema annotation, a caching policy, e.g., 'document-max-age="3600"'.

Therefore, at block 310, the client process caches the XML document (or causes the XML document to be cached anywhere on the network) and applies the caching policy, which was identified in the schema, to the XML document. For example, client process 206 (FIG. 2A) sets a timer for 1 hour, caches the document 205 (FIG. 2A) and when the timer expires, invalidates the document 205 and possibly submits a new request for the XML document to the document server 202. Because the XML schema applies to a class of documents, i.e., all the XML documents that conform to the schema, the foregoing process is repeated, at least in part, for every corresponding document instance that the client process receives. Thus, if, subsequent to receiving the XML document at block 302, the client process receives another document that conforms to the same XML schema, and the schema is still valid, then the client process should start a second timer for that second XML document, and invalidate the cached document when that timer expires. Furthermore, the client process would not need to access and scan the schema again, as long as the schema is still valid, i.e., a timer set for the schema's validity duration (e.g., schema-max-age="86400") has not yet expired.

Annotating Metadata with a Cache Policy for a Portion of a Document

According to one embodiment, the set S of bindings {p, C} for a class of documents, is embedded in annotations in metadata that corresponds to and defines the structure of each document in the class. As discussed, p is a path starting at the document root and leading to one or more document fragments, and C is the set of caching policies for all nodes found at p. Thus, a client process, such as client process 206 (FIG. 2A) should refresh portions of a cached document according to S.

According to one embodiment, the set S is embedded in an XML schema, at the respective definitions of the fragments' root elements. For each document fragment for which a caching policy is specified, the corresponding fragment root will have an annotation inside its schema definition. As discussed, instances of the class of documents defined by the schema point to the schema in a standard way. Consequently, document servers, such as document server 202 (FIG. 2A), can deliver XML data documents without modifications due to caching policies. Further, client processes, such as client process 206 (FIG. 2A), can retrieve the caching policies from the documents' schema.

The following is an example of a schema, stockRequest.xsd, relating to stock information XML data documents. This schema is annotated to include caching policies (in bold type) for respective portions, i.e., fragments, of documents that conform to this schema:

```
<?xml version="1.0" encoding="windows-1252"?>
<xsd:schema xmlns:xsd="http://www.w3.org/2001/XMLSchema"
        xmlns="http://www.example.com/stocks"
        targetNamespace="http://www.example.com/stocks">
    <xsd:annotation><xsd:app-info>
        <cache:control
            refreshLink= "http://chunk/2"
            schema-max-age= "86400"/>
    </xsd:app-info></xsd:annotation>
    <xsd:element name="quote">
        <xsd:complexType>
            <xsd:sequence>
                <xsd:element name="latest-price">
    <xsd:annotation><xsd:app-info>
        <cache:control
            refreshLink= "http://chunk/1?$userID"
            data-max-life= "600"/>
    </xsd:app-info></xsd:annotation>
                </xsd:element>
                <xsd:element name="news">
                    <xsd:complexType>
                        <xsd:sequence>
                            <xsd:element name="item"
maxOccurs="unbounded">
    <xsd:annotation><xsd:app-info>
        <cache:control
            refreshLink= "http://chunk/3?$userID"
            data-max-life= "7200"/>
    </xsd:app-info></xsd:annotation>
                            </xsd:element>
                        </xsd:sequence>
                    </xsd:complexType>
                </xsd:element>
                <xsd:element name="description"/>
            </xsd:sequence>
        </xsd:complexType>
    </xsd:element>
</xsd:schema>
```

For any node at the path p=quote/latest-price, the expiration time t=600 seconds (i.e., data-max-life). For any node at the path p=quote/news/item, the expiration time t=7200 seconds. Further, the expiration time of the XML schema itself is 86400 seconds (one day). The refresh Link information specifies a URL or other resource link, with which the corresponding fragment can be refreshed, such as upon expiration of the fragment.

Embedding fragment-based caching policies in corresponding metadata allows retrofitting of existing applications for caching purposes, and enables the use of dynamic fragment caching in existing applications (e.g., Web portals) that assemble responses from dynamic fragments. Furthermore, cache properties of document fragments are transmitted and processed once for a class of documents, rather than once per document. Since fragment policies are more numerous in a given document than the top-level document cache policy, avoiding redundant transmission of data for fragments is even more significant than for the whole documents.

Hardware Overview

Figure 4:
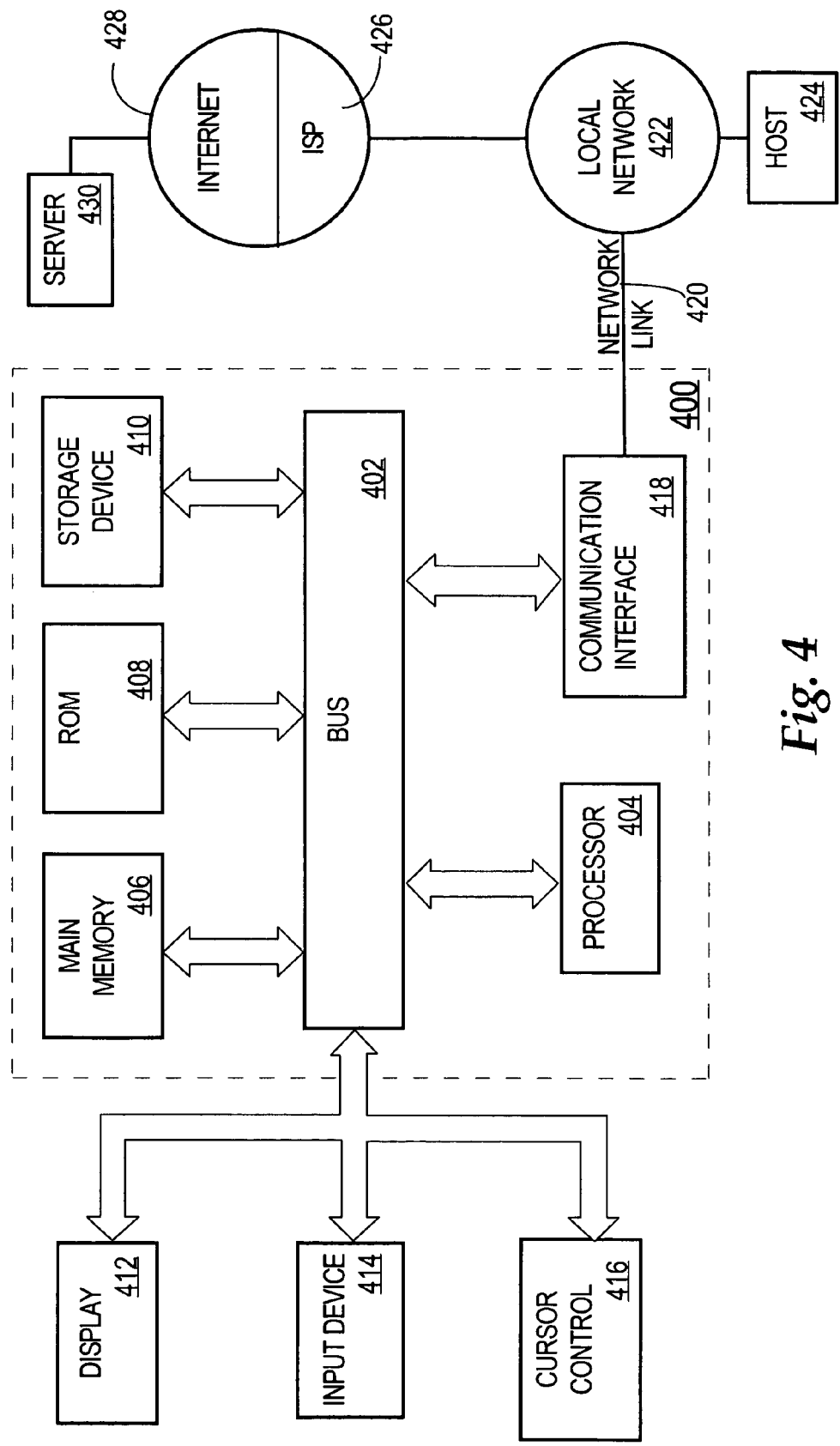
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing cached document fragments, the method comprising:
storing a schema document that describes a class of markup language documents in terms of constraints on the structure and content of markup language documents in the class;
wherein the schema document includes one or more caching policies;
wherein the one or more caching polices are applicable only to fragments of markup language documents in the class;
wherein at least one caching policy of the one or more caching policies indicates a duration for caching a fragment of a markup language document in the class;
storing a plurality of markup language documents that, according to the schema document, are in the class;
wherein each markup language document of the plurality of stored markup language documents has, according to the schema document, at least one fragment to which the at least one caching policy applies; and
serving the plurality of markup language documents and the schema document to a client process which causes the client process to cache fragments of the plurality of markup language documents in accordance with the at least one caching policy;
wherein the method is performed by one or more computing devices.

2. The method of claim 1, further comprising:
storing the schema document in a data repository.

3. The method of claim 2, further comprising:
storing the schema document as an XML schema document.

4. The method of claim 1, wherein the schema document is an XML schema document and each markup language document of the plurality of markup language documents is an XML document.

5. The method of claim 1, wherein the schema document includes a plurality of caching policies, and wherein at least one other caching policy of the plurality of caching policies specifies one or more servers that are allowed to cache a fragment of a markup language document in the class, and wherein each markup language document of the plurality of stored markup language documents has, according to the schema document, at least one fragment to which the at least one other caching policy applies, and wherein serving the plurality of markup language documents and the schema document to a client process further causes the client process to cache fragments of the plurality of markup language documents in accordance with the at least one other caching policy.

6. The method of claim 1, wherein the schema document includes a plurality of caching policies, and wherein the at least one other caching policy of the plurality of caching policies specifies a link to a resource for refreshing a fragment of a markup language document in the class, and wherein each markup language document of the plurality of stored markup language documents has, according to the schema document, at least one fragment to which the at least one other caching policy applies, and wherein serving the plurality of markup language documents and the schema document to a client process further causes the client process to cache fragments of the plurality of markup language documents in accordance with the at least one other caching policy.

7. A client computing device comprising:
one or more processors; and
a non-transitory computer-readable medium that stores instructions for managing cached document fragments, said instructions, when executed by said one or more processors, cause the client computing device to:
receive a schema document and a plurality of markup language documents; and
cache fragments of the plurality of markup language documents in accordance with at least one caching policy included in the schema document;
wherein each received markup language document of the plurality of markup language documents includes a reference to the schema document within the body of the document;
wherein the schema document describes a class of markup language documents in terms of constraints on the structure and content of markup language documents in the class;
wherein the schema document includes the at least one caching policy;
wherein the at least one caching policy indicates a duration for caching a fragment of a markup language document in the class;
wherein each markup language document of the plurality of markup language documents is in the class according to the schema document;
wherein each markup language document of the plurality of markup language documents has, according to the schema document, at least one fragment to which the at least one caching policy applies.

8. A non-transitory computer-readable medium that stores instructions for managing cached document fragments, said instructions, when executed by one or more computing devices, cause the one or more computing devices to:
store a schema document that describes a class of markup language documents in terms of constraints on the structure and content of markup language documents in the class;
wherein the schema document includes one or more caching policies;
wherein the one or more caching polices are applicable only to fragments of markup language documents in the class;
wherein at least one caching policy of the one or more caching policies indicates a duration for caching a fragment of a markup language document in the class;
store a plurality of markup language documents that, according to the schema document, are in the class;
wherein each markup language document of the plurality of stored markup language documents has, according to the schema document, at least one fragment to which the at least one caching policy applies; and
serve the plurality of markup language documents and the schema document to a client process which causes the client process to cache fragments of the plurality of markup language documents in accordance with the at least one caching policy.

9. The non-transitory computer-readable medium of claim 8, further comprising instructions which, when executed by the one or more computing devices, cause the one or more computing devices to:
store the schema document in a data repository.

10. The non-transitory computer-readable medium of claim 9, further comprising instructions which, when executed by the one or more computing devices, cause the one or more computing devices to:
store the schema document as an XML schema document.

11. The non-transitory computer-readable medium of claim 8, wherein the schema document is an XML schema document and each markup language document of the plurality of markup language documents is an XML document.

12. The non-transitory computer-readable medium of claim 8, wherein the schema document includes a plurality of caching policies, and wherein at least one other caching policy of the plurality of caching policies specifies one or more servers that are allowed to cache a fragment of a markup language document in the class, and wherein each markup language document of the plurality of stored markup language documents has, according to the schema document, at least one fragment to which the at least one other caching policy applies, the non-transitory computer-readable medium further comprising instructions which, when executed by the one or more computing devices, cause the one or more computing devices to:

serve the plurality of markup language documents and the schema document to a client process which causes the client process to cache fragments of the plurality of markup language documents in accordance with the at least one other caching policy.

13. The non-transitory computer-readable medium of claim 8, wherein the schema document includes a plurality of caching policies, and wherein the at least one other caching policy of the plurality of caching policies specifies a link to a resource for refreshing a fragment of a markup language document in the class, and wherein each markup language document of the plurality of stored markup language documents has, according to the schema document, at least one fragment to which the at least one other caching policy applies, the non-transitory computer-readable medium further comprising instructions which, when executed by the one or more computing devices, cause the one or more computing devices to:

serve the plurality of markup language documents and the schema document to a client process which causes the client process to cache fragments of the plurality of markup language documents in accordance with the at least one other caching policy.

14. A server computing device comprising:

one or more processors; and a non-transitory computer-readable medium that stores instructions for managing cached document fragments, said instructions, when executed said the one or more processors, causes the server computing device to:

store a schema document that describes a class of markup language documents in terms of constraints on the structure and content of markup language documents in the class;

wherein the schema document includes one or more caching policies;

wherein the one or more caching polices are applicable only to fragments of markup language documents in the class;

wherein at least one caching policy of the one or more caching policies indicates a duration for caching a fragment of a markup language document in the class;

store a plurality of markup language documents that, according to the schema document, are in the class;

wherein each markup language document of the plurality of stored markup language documents has, according to the schema document, at least one fragment to which the at least one caching policy applies; and serve the plurality of markup language documents and the schema document to a client process which causes the client process to cache fragments of the plurality of markup language documents in accordance with the at least one caching policy.

\* \* \* \* \*

UNITED STATES PATENT AND TRADEMARK OFFICE
CERTIFICATE OF CORRECTION

| | | |
|---|---|---|
| PATENT NO. | : 7,756,922 B2 | Page 1 of 1 |
| APPLICATION NO. | : 11/341194 | |
| DATED | : July 13, 2010 | |
| INVENTOR(S) | : Julie Basu et al. | |

It is certified that error appears in the above-identified patent and that said Letters Patent is hereby corrected as shown below:

In column 6, line 65-66, delete "stockrequest.xsd," and insert -- stockRequest.xsd, --, therefor.

In column 7, line 42, delete "stockrequest.xsd," and insert -- stockRequest.xsd, --, therefor.

Signed and Sealed this
Twenty-sixth Day of April, 2011

David J. Kappos
*Director of the United States Patent and Trademark Office*